US009894822B2

(12) United States Patent
Beeck et al.

(10) Patent No.: US 9,894,822 B2
(45) Date of Patent: Feb. 20, 2018

(54) AGRICULTURAL IMPLEMENT TOOL MOUNTING ASSEMBLY

(71) Applicant: DEERE & COMPANY, Moline, IL (US)

(72) Inventors: Mark D. Beeck, Ankeny, IA (US); Robert T. Casper, Mingo, IA (US); Richard J. Connell, Slater, IA (US); David L. Steinlage, Centralia, KS (US); Daniel P. Bruns, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 293 days.

(21) Appl. No.: 14/635,783

(22) Filed: Mar. 2, 2015

(65) Prior Publication Data

US 2016/0255759 A1 Sep. 8, 2016

(51) Int. Cl.
A01B 21/08 (2006.01)
(52) U.S. Cl.
CPC .................. *A01B 21/086* (2013.01)
(58) Field of Classification Search
CPC .............................. A01B 21/086; A01B 35/28
See application file for complete search history.

(56) References Cited

U.S. PATENT DOCUMENTS

| 2,247,367 A | 7/1941 | Frudden et al. |
| 2,873,149 A | 2/1959 | Redetzke |
| 3,104,123 A * | 9/1963 | Newkirk ................ A01B 21/08 172/445.2 |
| 3,550,969 A * | 12/1970 | Robinson ............... A01B 35/22 403/188 |
| 3,642,333 A | 2/1972 | Eisenhardt et al. |
| 3,825,073 A | 7/1974 | Gardner et al. |
| 3,825,358 A | 7/1974 | Eisenhardt et al. |
| 4,002,206 A * | 1/1977 | Eisenhardt ............. A01B 13/16 172/763 |
| 4,011,916 A | 3/1977 | Neal et al. |
| 4,032,245 A | 6/1977 | Woodruff |
| 4,178,999 A | 12/1979 | Hansen |
| 4,194,576 A | 3/1980 | Graber |
| 4,203,494 A | 5/1980 | Hansen |
| 4,428,437 A | 1/1984 | Steinberg |
| 4,738,316 A * | 4/1988 | Wood ................... A01B 21/086 172/603 |
| 4,759,411 A | 7/1988 | Williamson |

(Continued)

*Primary Examiner* — Jamie L McGowan
(74) *Attorney, Agent, or Firm* — Taft Stettinius & Hollister LLP; Stephen F. Rost

(57) ABSTRACT

A tool assembly for an agricultural implement includes a ground-engaging tool mounted to the implement support frame by an assembly of a support post, a mounting bracket and a frame mount. At least one of the support post and the mounting bracket includes a substantially cylindrical rod and a collar having an axial opening configured to receive the rod. An interface arrangement may provide multiple contact areas between the support post and the collar. A recessed pocket may retain a nut that threads onto set screw used to engage the rod, such as at a detent recess, and fix the position of the support post with respect to the mounting bracket. The mounting bracket may provide for alternate fore-aft and lateral mounting orientations.

15 Claims, 10 Drawing Sheets

(56) References Cited

U.S. PATENT DOCUMENTS

| | | | | |
|---|---|---|---|---|
| 4,815,544 | A * | 3/1989 | Good | A01B 21/086 |
| | | | | 172/430 |
| 5,054,561 | A | 10/1991 | Bussiere et al. | |
| 5,462,124 | A * | 10/1995 | Rawson | A01B 35/28 |
| | | | | 172/569 |
| 5,485,886 | A * | 1/1996 | Bassett | A01B 63/24 |
| | | | | 172/744 |
| 6,102,132 | A * | 8/2000 | Schimke | A01B 15/18 |
| | | | | 111/139 |
| 6,158,523 | A * | 12/2000 | Gengler | A01B 15/18 |
| | | | | 172/572 |
| 6,516,895 | B2 | 2/2003 | Yeomans | |
| 7,628,218 | B2 | 12/2009 | Cresswell | |
| 7,762,345 | B2 * | 7/2010 | Rozendaal | A01B 35/16 |
| | | | | 172/145 |
| 8,307,909 | B1 | 11/2012 | Rozendaal et al. | |
| 9,271,438 | B2 * | 3/2016 | Reade | A01B 63/008 |

* cited by examiner

AGRICULTURAL IMPLEMENT TOOL MOUNTING ASSEMBLY

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates to agricultural implements, and in particular to mounting tool assemblies to agricultural implements.

BACKGROUND OF THE DISCLOSURE

Agricultural implements and machines, such as various plows, tillers, rippers, seeders, nutrient applicators, etc., are used to work soil of crop fields. Tillage and other agricultural implements can perform a variety of tasks, such as breaking up tough soil, injecting nutrients into the soil, and leveling the soil. Such implements are commonly towed behind work vehicles, such as tractors, and can be outfitted with a variety of ground-engaging tools, such as shanks and disks, depending on the soil preparation operation being carried out.

The ability to efficiently and effectively conduct soil preparation operations is highly affected by the soil conditions, such as the wetness of the soil, how much crop residue is in the soil, and the general composition of the soil. In some agricultural implements, ground-engaging tools may suffer from a buildup of soil and crop residue, especially when the soil is wet, resulting in decreased efficiency of the ground-engaging tools and potentially clogging the ground-engaging tools. This may require the operator of the work vehicle and agricultural implement to stop and exit the machine to manually unclog or clean the ground-engaging tools, resulting in lost time and decreased productivity. Another issue is establishing and maintaining the proper orientation of the ground-engaging tools with respect to the frame, and thereby alignment with the direction of travel of the implement and machine, to achieve a consistent furrow row spacing. Yet another issue is establishing proper contact of the ground-engaging tools with the ground to achieve the desired soil preparation, including creating the furrows at a desired depth into the ground, or at consistent depth across the width of the implement transverse to the travel direction of the machine.

SUMMARY OF THE DISCLOSURE

A tool mounting arrangement for an agricultural implement is disclosed that improves the mounting of the ground-engaging tools to the implement frame in one or more respects.

According to one aspect the disclosure provides a tool assembly for an agricultural implement. The assembly includes a ground-engaging tool, a support post coupled to the tool, a mounting bracket connecting the support post at a connection axis, and a frame mount coupled to the mounting bracket to mount the tool to a support frame of the implement. The mounting bracket is couplable to the support post in alternate orientations. In a first orientation the mounting bracket is positioned to mount the support post to a first fore-aft side of the support frame and mount the frame mount to a first side of a connection center line axis intersecting the support frame and the connection axis. In a second orientation the mounting bracket is positioned to mount the support post to the first fore-aft side of the support frame and mount the frame mount to a second side of the connection center line axis opposite the first side of the connection center line axis.

According to another aspect, the disclosure provides a tool assembly for an agricultural implement including a ground-engaging tool, a support post coupled to the tool, a mounting bracket connecting the support post at a connection axis, and a frame mount coupled to the mounting bracket to mount the tool to the support frame. At least one of the support post and the mounting bracket includes a rod having a curved outer periphery and a collar having an axial opening about the connection axis configured to receive the rod. The collar defines a recessed pocket open to the axial opening and a radial passage extending between the pocket and an outer surface of the collar. The pocket is configured to receive a first threaded fastener and the passage is configured to receive a second threaded fastener configured to extend into the axial opening to engage the rod. The first threaded fastener threadedly engages the second threaded fastener.

According to another aspect, the disclosure provides a tool assembly for an agricultural implement including a ground-engaging tool, a support post coupled to the tool, a mounting bracket connecting the support post at a connection axis, and a frame mount coupled to the mounting bracket to mount the tool to the support frame. At least one of the support post and the mounting bracket includes a rod and a collar having an axial opening about the connection axis configured to receive the rod. The axial opening has an inner peripheral surface configured to provide more than one contact area between the rod and the collar.

These and other features and advantages of the present disclosure will become apparent to a person skilled in the art from the following description and the accompanying drawings.

BRIEF DESCRIPTION OF THE DRAWINGS

Like reference numerals in the drawings indicate like components, parts, or operations.

DETAILED DESCRIPTION

Figure 1:
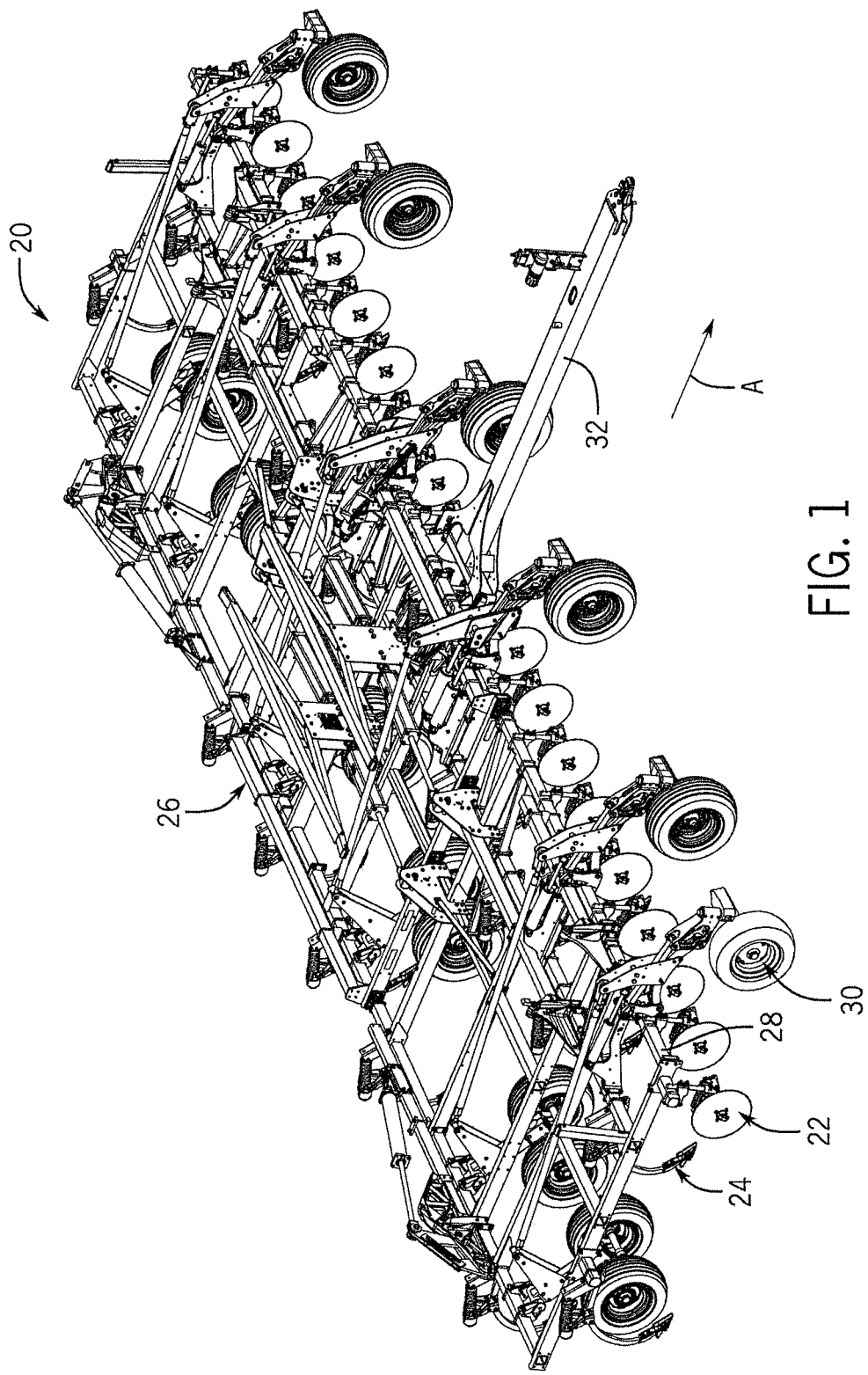
FIG. 1 is a perspective view showing an example agricultural implement having mounting assemblies for ground-engaging tools according to the present disclosure, the illustrated example being in the form of coulter disk assemblies.
Figure 2:
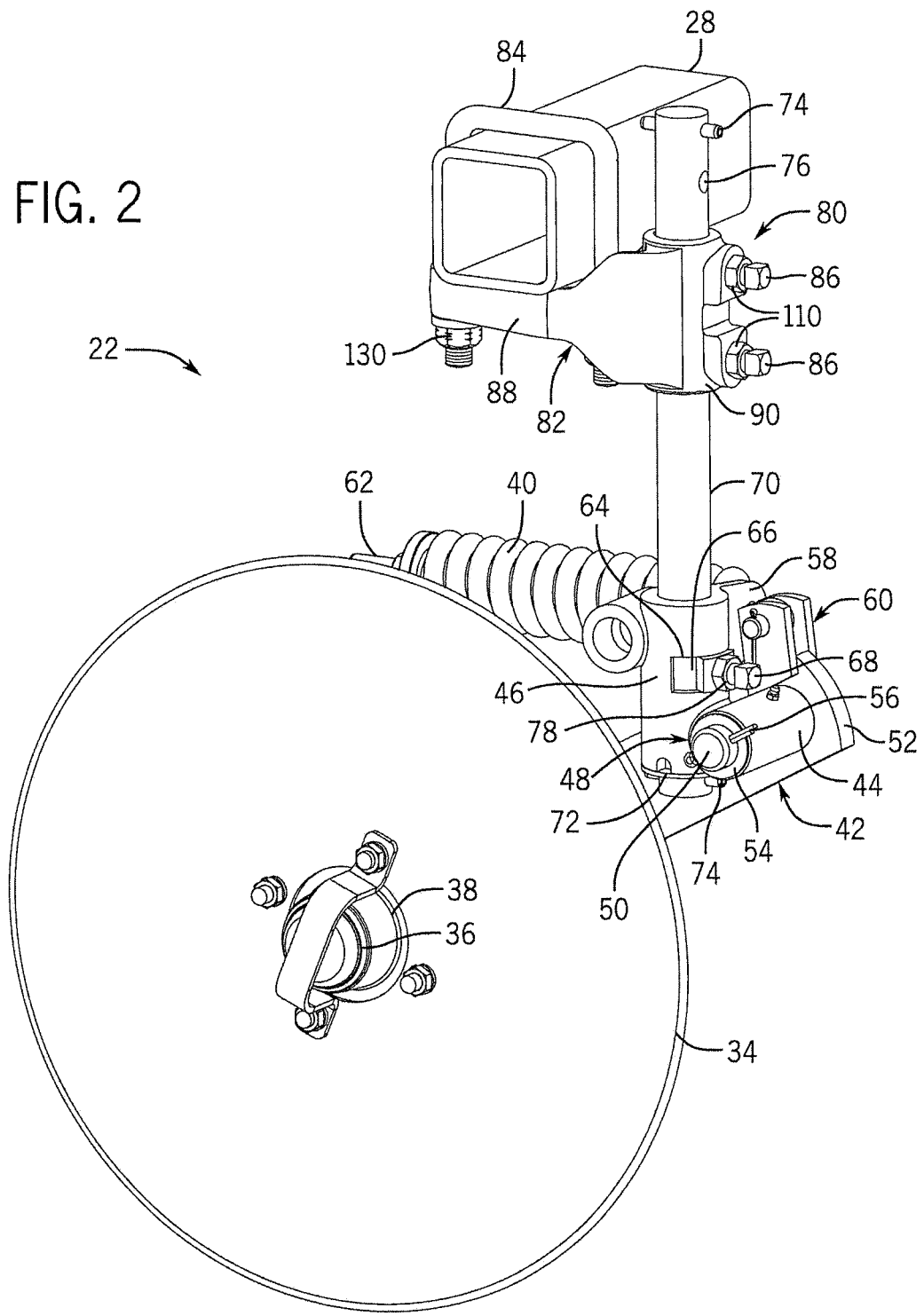
FIG. 2 is a front perspective view of one example coulter disk assembly for the agricultural implement of FIG. 1.

The following describes one or more example embodiments of the disclosed tool mounting assembly, as shown in the accompanying figures of the drawings described briefly above. Various modifications to the example embodiments may be contemplated by one of skill in the art.

In certain work and agricultural implements it may be beneficial to improve the mount of ground-engaging elements or tools. For example, various soil-conditioning implements, including primary, seedbed, and vertical tillage implements as well as seeders, nutrient applicators and disk implements, may include any number of rippers, cutters, chiselers, tillers, shanks, baskets and disks in various forms. Apart from general connectivity concerns, it may be particularly important to the operation and performance of the implement that the ground-engaging tools are mounted to the implement in the proper location and orientation relative to the implement and/or other tools and that the tools are maintained in that location and orientation during operation of the implement. As one example, it may be important for ground-engaging shanks to be mounted to the implement in a particular arrangement so that the furrows or other trenches which they form in the ground are in parallel and at a consistent, prescribed distance that may help to maximize crop yield of the field and may also coordinate with the spacing of other tools of the implement or other implements. For example, ground-engaging closing disks may need to be arranged on the implement behind and in alignment with the ground-engaging shanks in the direction of travel in order to properly cover the furrows.

Moreover, since the tools and implements may vary widely in configuration, the quantity and mounting locations and orientations of the ground-engaging tools may vary, and the desired row spacing may vary depending on crop or other field conditions, it may be important that the mounting arrangement facilitates adjustment and relocation of the tools on the implement. As noted, any adjustment feature should not interfere with the tool being mounted in a manner that maintains its positioning during operation.

In certain embodiments, the mounting arrangement disclosed herein may provide for adjustment of the tool with respect to the implement using a conventional bar and channel clamp connection. A mounting bracket may provide a complementary surface or recess for interfacing with a support bar of the implement's frame (e.g., a flat, broad surface or recess for supporting a square bar) and to which mounts the channel clamp (e.g., a square U-bolt or the like). The bar and clamp connection may provide for mounting of the tool in various lateral positions (i.e., side to side relative to the direction of travel of the machine). The mounting bracket may also provide a mounting connection for an upright support post of the ground-engaging tool. The mounting connection may be a pivot connection, which includes a collar with an axially extending opening formed as a part of the mounting bracket or the support post. The pivot connection may thus permit the angular orientation of the tool to be adjusted.

The mounting bracket may also be configured to permit the mounting connection for the tool's support post to be disposed either fore or aft of the support bar relative to the direction of travel. Further, the mounting bracket may be configured to be reversible such that in one mounting orientation the support post may be positioned forward of the support bar, which in an alternate "reversed" orientation the support post may be positioned behind the support bar.

Still further, the mounting bracket may be configured so that the support post may be offset or out of alignment with the channel clamp in the direction of travel. Thus, the mounting bracket may thus provide two, alternate lateral (i.e., side to side relative to the direction of travel) mounting positions for the support post of the tool. In one mounting orientation of the mounting bracket the support post of the tool may be offset to a first lateral side of the channel clamp, and to a second, opposite lateral side of the channel clamp when the mounting bracket is in a second, alternate mounting orientation. Moreover, the mounting bracket may be configured to provide for both alternate lateral and alternate fore-aft mounting locations for the support post of the tool.

In certain embodiments, the connection between the mounting bracket and the support post may be secured by a detent arrangement. The detent may be a hole or recess, or it may be a raised projection, at the interface between, and part of either, the mounting bracket and the support post. The detent arrangement provides a positive engagement of the support post to the mounting brackets. Multiple detents may be provided in a spaced arrangement to allow for vertical adjustment of the support post.

In certain embodiments, the detent arrangement may include or cooperate with a securing mechanism. As one example, the securing mechanism may be a fastener that extends into the axial opening of the collar (of either the mounting bracket or the support post) to engage a rod member (of either the support post or the mounting bracket). Further, the fastener and the detent may be configured to engage one another, for example, the detent may be a recess that receives an end of the fastener. Engagement of the two parts may inhibit relative angular rotation or axial translation of the mounting bracket and the support post.

In certain configurations, the fastener may be a threaded rod or bolt and may engage a threaded opening, collar or nut. The threaded rod or bolt may be tightened relative to the threaded opening, collar or nut to clamp the rod member (of the mounting bracket or the support post) against the inner periphery of the axial opening of the collar (of the support post or mounting bracket).

The axial opening of the collar may be cylindrical or non-cylindrical and may be open at one or both ends. The axial opening may provide multiple clamping points or regions. For example, the axial opening may have a varied dimension or degree of concavity by having a certain circular or non-circular arc for an angular portion of one or more of cross-sections, and a different circular or non-circular arc for one or more other angular portions of its cross-section(s). Further, the axial opening may have a predominately circular cross-section for 180 degrees or more and one or more recessed areas at a greater radial distance from a reference axis of the axial opening (or the axis of the rod member or support post) than the circular portion of the cross-section. The recessed area(s) may be located opposite to (or to an opposite side of the axial opening than) the threaded fastener (and the detent(s)). Engaging the threaded fastener against the rod member inside the axial opening thus clamps the rod member against the axial opening at the two or more regions on each angular end of the dished area(s). The surfaces interposed between the recessed areas and the non-recessed surfaces of the opening thus form clamping surfaces. The clamping surfaces may, for example, be short, flat angled surfaces. As one non-limiting example, the axial opening may have one radially extending recess running the axial length of the axial opening and opposite the detent(s) such that the rod member is clamped against the axial opening at flat clamp surfaces on each side of the recess, thus clamping the rod member at three points, which may be at equal (i.e., 120 degrees) or non-equal angular positions.

Moreover, the axial opening may have one or more enlarged sections so that the clamping force may be selectively located. For example, the axial opening may have an enlarged central section compared to upper and lower end sections. The end sections may form the recessed areas and the clamp surfaces, in which case the clamping forces applied to the rod member (e.g., the support post) may be spread apart an axial distance, which may provide better resistance to moment loading during operation to provide a more secure connection between the support post and the mounting bracket, and thereby between the tool and the frame.

In certain embodiments, the collar (of the mounting bracket or the support post) may be formed with a pocket that carries the threaded collar or nut. The pocket may be located so that the open side of the pocket is adjacent to the opening in the collar, and may be deep enough to receive the threaded collar or nut without it protruding into the collar opening. Also, the inner periphery of the pocket may be any curved or rectilinear configuration. For example, the inner periphery of the pocket may be multi-sided, such as defining a six-sided opening configured to mate with a standard nut.

With reference to the accompanying figures, one or more specific example arrangements will now be described. It is understood that the illustrated examples are not limiting, but merely provide examples to aid in describing the features of the disclosed mounting arrangement. Reference to particular common components (e.g., nuts, bolts, screws, washers and the like) should be understood to encompass other known components or techniques providing similar functions. It should also be understood that male-female features of mating parts (e.g., nuts and bolts, rods and collars, and so on) may be reversed from that shown and described in the illustrated examples without departing from the scope of the disclosure.

Moreover, it should be noted that reference herein to relative terms is made as a matter of convenience. "Forward" (or "fore") and "rearward" (or "aft") (and, generally, references to the "longitudinal" direction) are generally determined based upon the normal direction of travel for a relevant vehicle or implement. Similarly, references to a "lateral" direction generally refer to directions transverse to the longitudinal direction, with "left" and "right" directions being determined based from a perspective facing the forward direction for a vehicle. "Upward" and "downward" directions are relative to the ground. These terms may or may not align with true "horizontal" or "vertical" directions.

FIG. 1 shows an example agricultural implement 20, in the form of a nutrient applicator, that may be towed by a work vehicle, such as an agricultural tractor (not shown). As will be understood, the work vehicle, and thereby the agricultural implement 20, moves forward in a direction of travel indicated by arrow "A", and has right and left lateral sides relative to a forward facing direction. As noted, the agricultural implement 20 may include a variety of ground-engaging tools, such as rippers, cutters, chiselers, tillers, and specifically coulter disk assemblies 22 and shanks or standards 24 connected to a frame 26 of interconnecting tubular toolbars or support frame members 28, which may form a central frame and two outer wings on each lateral side of the central frame. It will be understood that the agricultural implement 20 may have various other configurations. The ground-engaging tools may be used for various ground preparation operations, including loosening soil and creating furrows in the ground. Various ground-engaging wheels 30 may support the frame 26. A hydraulic system, including various hydraulic cylinders, may be mounted to the frame 26 to fold and unfold the outer wings of the frame 26 as well as to adjust the position of the wheels 30, and thereby, raise and lower the frame 26 relative to the ground. A draw or hitch bar 32 may be connected to the frame 26 to couple the agricultural implement 20 to the vehicle.

Figure 7:
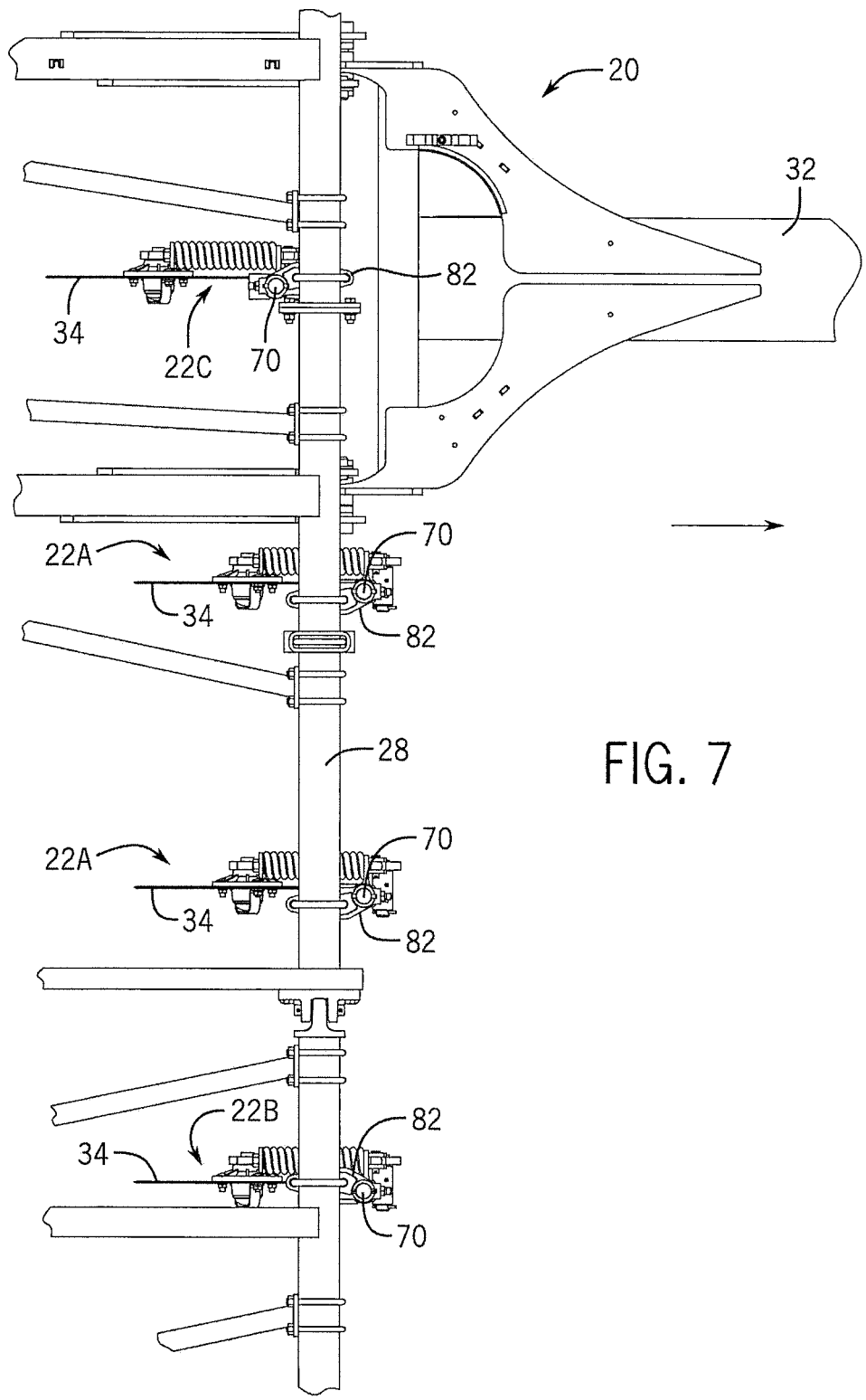
FIG. 7 is a partial top view of the agricultural implement of FIG. 1 illustrating various left-hand, right-hand and fore-aft mounting orientations for the coulter disk assemblies.
Figure 8:
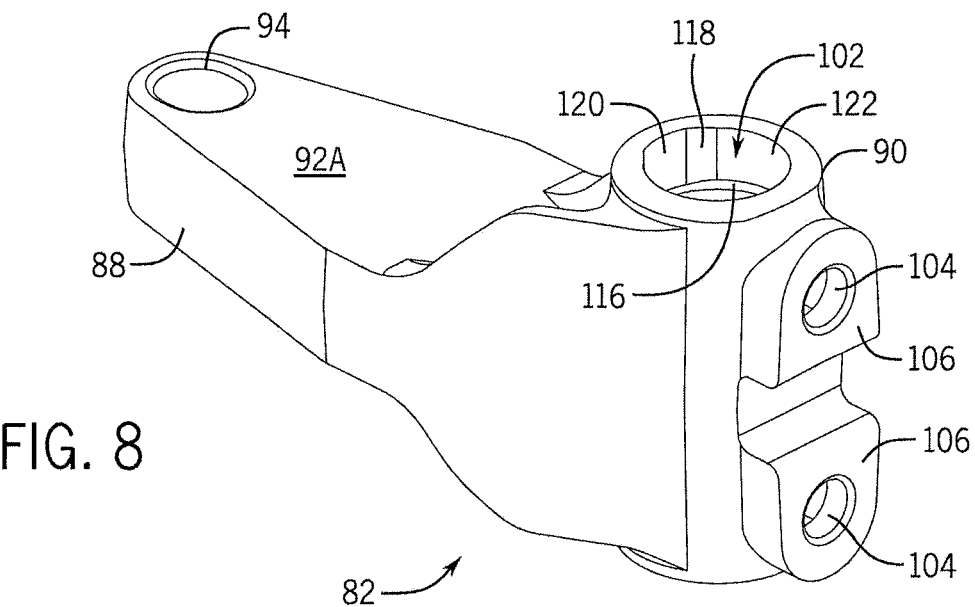
FIGS. 8 and 9 are perspective views of the mounting bracket for the coulter disk assembly of FIG. 2 shown in isolation.
Figure 9:
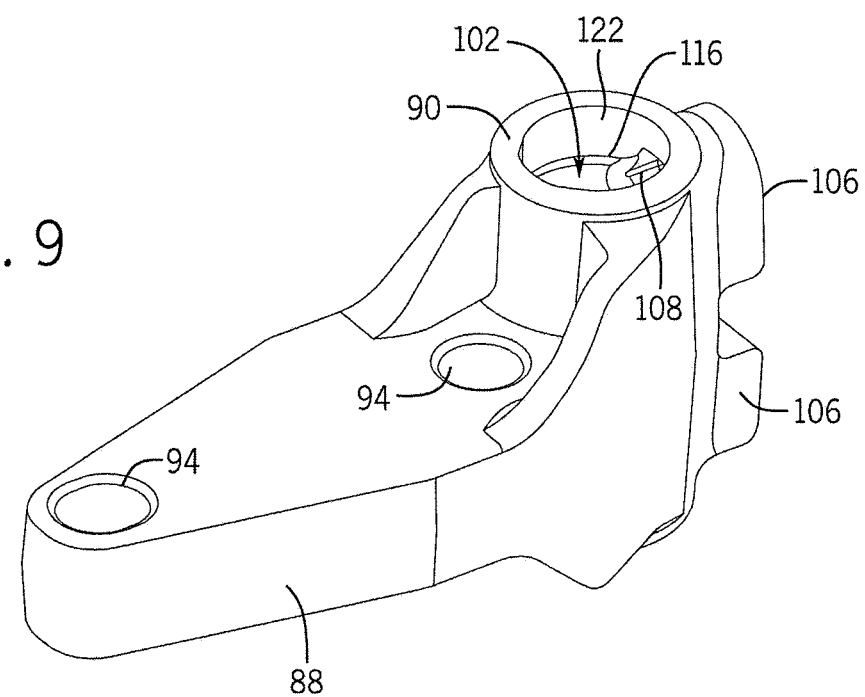
Figure 10:
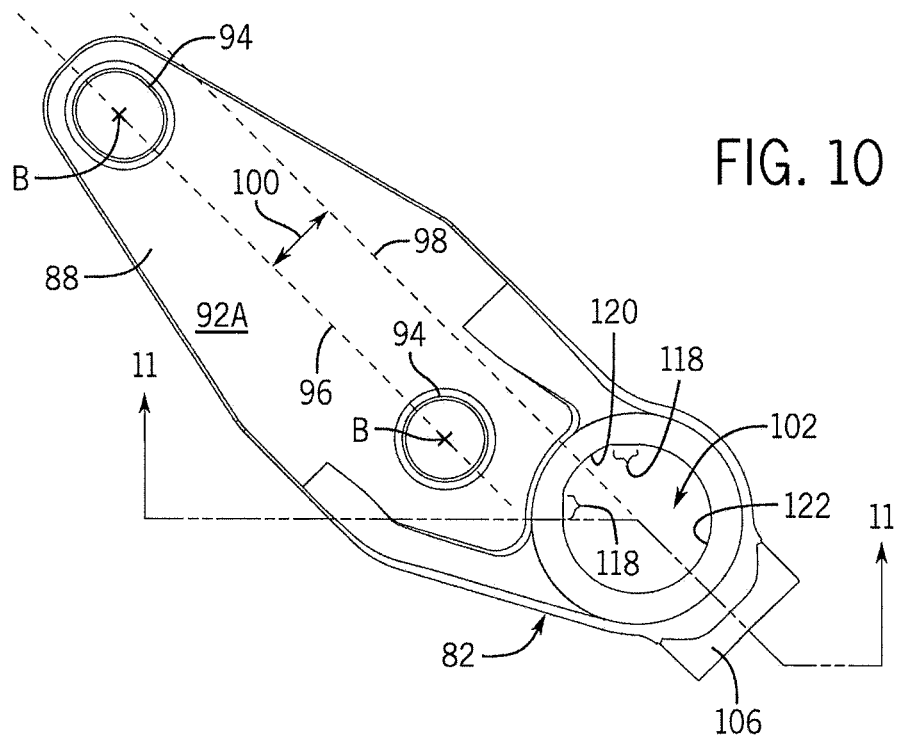
FIG. 10 is a top view thereof.

As shown in FIGS. 1 and 7, a plurality of the coulter disk assemblies 22 may be mounted to the frame 26 and spaced apart perpendicular to the direction of travel. It will be appreciated that the number of, and spacing between, the coulter disk assemblies 22 may vary. For example, the count and spacing of the coulter disk assemblies 22 may be set according to the number and location of the standards 24, such as to center adjacent pairs of the coulter disk assemblies 22 on center lines of the standards 24 parallel to the direction of travel A. The adjacent coulter disk assemblies 22 may be staggered in the fore/aft direction relative to one another to reduce the occurrence of clogging. As noted, the coulter disk assemblies 22 may alternatively be mounted at different fore/aft and left/right locations along the frame 26.

Referring also to FIGS. 2-5, each coulter disk assembly 22 may have a coulter disk 34 mounted for rotation by a hub bearing assembly 36 to a support hub 38. A return spring 40 may be mounted between the support hub 38 and an end of a support arm assembly 42 also mounted to the support hub 38. The support arm assembly 42 may include a pair of collars 44 and 46 held in fixed relative position, such as by weldment or the like. The collar 44 may be arranged generally horizontally about a laterally extending axis, and the collar 46 may be arranged generally vertically about an upright, traverse axis, which may be generally perpendicular to the lateral axis of the collar 44. The collar 44 may be part of a pivot assembly 48 for adjusting the angular orientation of the coulter disk 34 relative to the direction of travel A. The pivot assembly 48 may have a cylindrical bushing (not shown) housed within the collar 44. A pivot pin 50 may be arranged through the center of the bushing for relative rotation about the lateral axis. The pivot pin 50 may be press-fit, welded or otherwise fixedly connected to a strut 52 of the support arm assembly 42. The opposite, open end of the collar 44 may be capped by a washer 54, and a retainer pin 56 extending through an opening at an end of the pivot pin 50 may prevent the pivot pin 50 from separated from the bushing, and thereby prevent the support arm assembly 42 and the coulter disk 34, from separating from the pivot assembly 48.

As noted, the collar 46 may be arranged perpendicularly with respect to the collar 44 so as to extend about a transverse (e.g., vertical) axis. The collar 46 may be formed with, or augmented by, an ear or tab 58 that extends laterally between the return spring 40 and a clevis arrangement 60 mounted to the strut 52 of the support arm assembly 42. The tab 58 may be used to provide a backstop surface of the forward end of the return spring 40. In addition, or alternatively, the tab 58 may have a threaded opening (not shown) for a threaded tensioner rod 62 for setting and adjusting a pre-load or otherwise tensioning the return spring 40. The collar 46 may have a window 64 spanning an arcuate portion of the circumference of the collar 46 and opening toward the collar 44. The window 64 may receive a projection of locking collar 66 having a threaded opening for a set screw 68.

The collar 46 may thus provide a connection for an upright support post 70, which provides the vertical extension component coupling of the coulter disk 34 to the frame 26. Generally, the collar 46 defines an cylindrical opening sized to receive the support post 70, which may extend below a lower open end of the collar 46. The lower end of the collar 46 may be capped by a washer 72 and a retainer pin 74 passing through an opening at an end of the support post 70 to limit the upward movement of the support post 70 relative to the collar 46, and thus from being raised and separated from the support arm assembly 42 and the coulter disk 34. Downward movement of the support post 70 may be limited by a second retainer 74 at an opening through the upper end of the support post 70.

The locking collar 66 fits about the support post 70 within the collar 46, being assembled by first putting the locking collar 66 into the cylindrical opening of the collar 46 through the window 64 and then sliding the support post 70 through the concentric openings of the collar 46 and the locking collar 66. In this position, the projection of the locking collar 66 extends through the window 64. The locking collar 66 may then be secured to the support post 70 by threading the set screw 68 through the threaded opening in the locking collar 66 so that its end engages the support post 70. A nut 78 or additional threaded collar may thread onto the set screw 68 to further secure the set screw 68 in place.

The support post 70 may have one or more detents 76, which in the illustrated example is a tapered recess, such as having a conical or spherical cross-section. The end of the set screw 68 may have a complementary shape to aid in seating or nesting the set screw 68 in the detent 76 and securely coupling the support post 70 to the collar 46. The support post 70 may have a single detent 76, or it may have multiple vertically spaced detents to permit vertical adjustment of the position of the support post 70, and thereby the coulter disk 34. Additionally, the support post 70 may have a pair of detents 76, or set of paired detents, that are arranged in an angularly spaced relation. For example, one or more pairs of detents 76 may be arranged 180 degrees apart to allow for reversible mounting configurations should the support post 70 or other components have features (e.g., detents) that require a particular angular orientation and alignment to function, as described herein.

The support post 70, and thereby the coulter disk assembly 22, may mount to one of the support frame members 28 by a mounting assembly 80. The mounting assembly 80 may include a mounting bracket 82, a clamp fastener 84 (e.g., a square U-bolt) and one or more fastener arrangements for adjustably coupling the support post 70 to the mounting bracket 82. The example fastener arrangement described below includes a pair of mating set screws 86 and nuts 110. However, these terms should be understood to include any suitable male/female connection hardware, including threaded devices (e.g., screws, bolts, nuts, etc.) and non-threaded devices (e.g., pins, spring pins, collars, etc.).

As shown in FIGS. 8-11, the mounting bracket 82 may have a support flange 88 that extends in cantilever fashion from a mounting collar 90. The support flange 88 may be configured to facilitate secure yet adjustable coupling to the support frame member 28 in various ways. For example, as shown, the support flange 88 may have a flat support face 92A allowing for surface area contact with the flat underside of the support member 28. The support flange 88 may have a similarly configured flat support face 92B at the opposite side of the mounting bracket 82. The support flange 88 may have a pair of spaced apart mounting openings 94 that are aligned about upright axes B, which are parallel to a connection axis C which passes through the mounting collar 90. The mounting openings 94 may be arranged spaced apart along a mounting center line axis 96 of the support flange 88 that is offset from a parallel connection center line axis 98 that may intersect the connection axis C and the support frame member 28. The support flange 88 may be generally symmetric about the mounting center line axis 96, generally tapering uniformly toward the free end, and thus may be considered offset from the mounting collar 90 by the perpendicular offset distance 100 between the center line axes 96 and 98. The mounting openings 94 are spaced apart along the center line axis 96 a distance sufficient to permit the support frame member 28 to fit between the mounting openings 94 and to cooperate with the clamp fastener 84, which as noted may be an appropriately configured channel clamp, such as a square U-bolt. As will be understood, the clamp fastener 84 will clamp the mounting bracket 82, and thereby the coulter disk assembly 22, to the support frame member 38 by the cross-member of the U-bolt engaging the upper side of the support frame member 28 and the legs of the U-bolt passing along the sides of the support frame member 28 and through the mounting openings 94. Suitable fastening hardware 130 (e.g., nuts, washers, etc.) may fit onto the U-bolt legs and engage their threaded ends. Tightening the hardware will drive the U-bolt cross-member toward the mounting bracket 82 until the underside of the support frame member 28 contacts the support face 92A of the support flange 88. As shown, one or more of the mounting openings 94 may be a slot or otherwise be oblong or oversized to allow for adjustment or to accommodate different sizes of fasteners.

Figure 3:
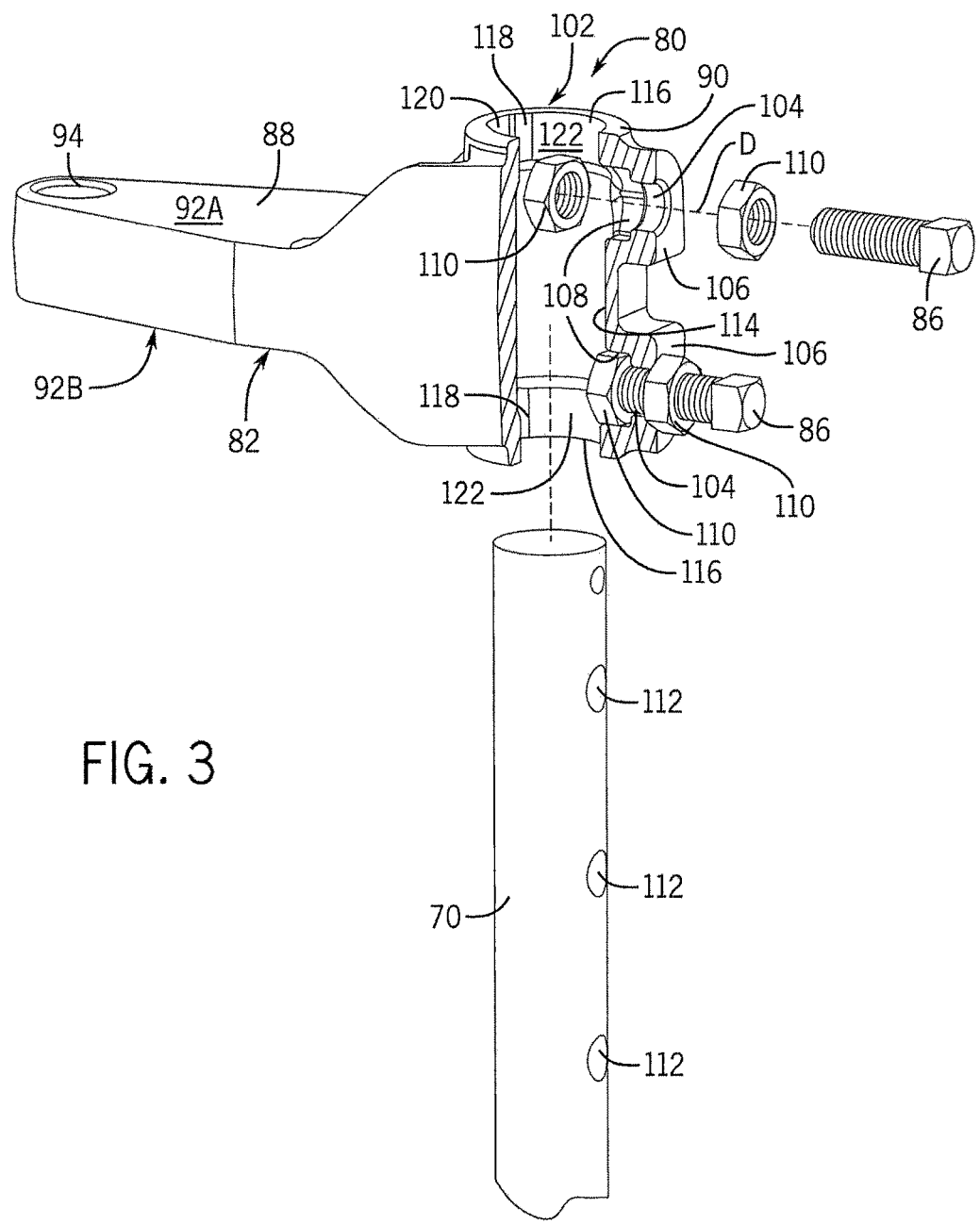
FIG. 3 is an enlarged partial assembly view thereof with a mounting bracket shown in cross-section.
Figure 4:
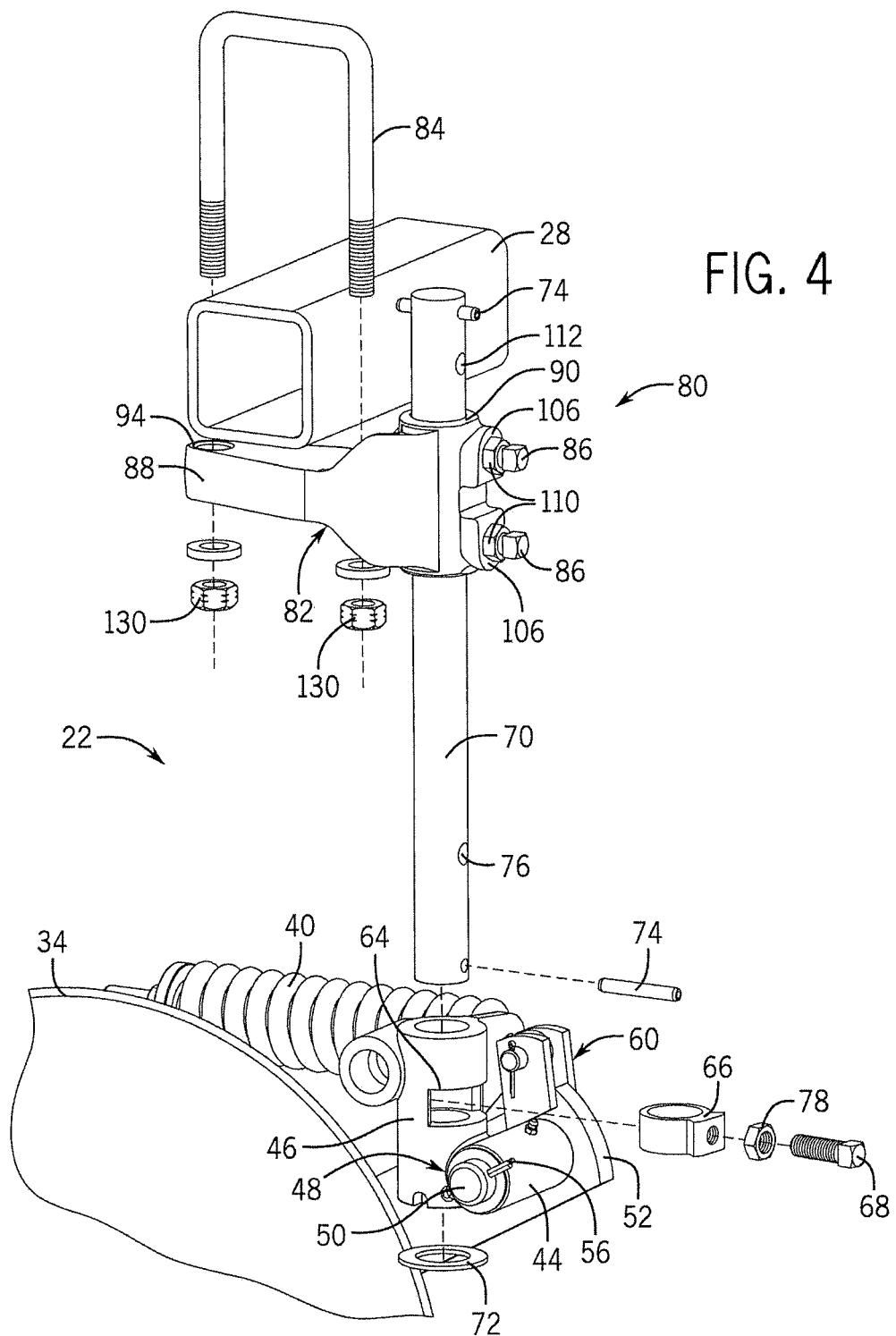
FIG. 4 is another partial assembly view thereof.
Figure 5:
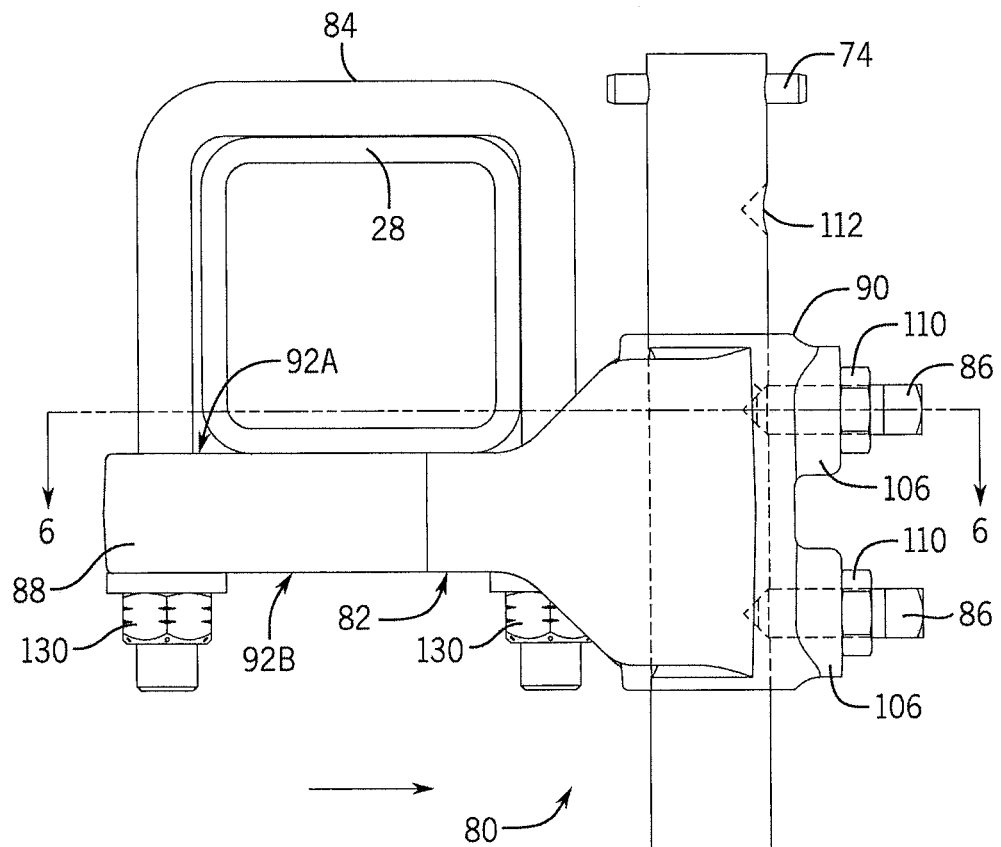
FIG. 5 is a partial side view thereof.
Figure 11:
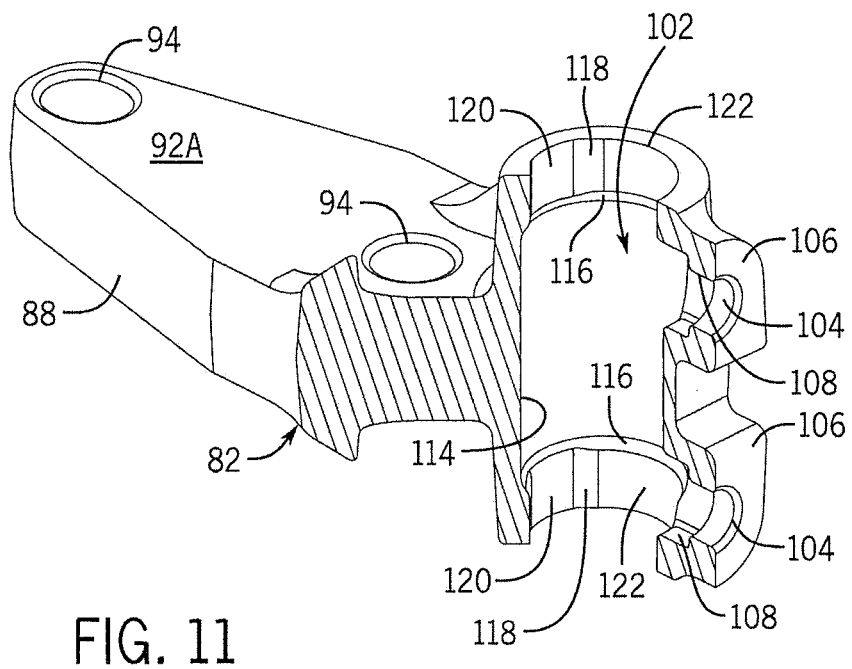
FIG. 11 is a perspective, cut-away view thereof.

As mentioned, the mounting collar 90, and its axial opening 102, extends along the upright connection axis C. The mounting collar 90 may have one or more radial openings, such as the pair of axially spaced apart radial openings 104, which are open-ended at the inner and outer peripheries of the mounting collar 90. The radial openings 104 each open about an axis D that intersects the connection axis C, and be arranged along a common upright line so as to extend along the mounting center line axis 98. The axes D may fall on one or more different lines, however, which do not intersect the connection axis C or the mounting center line axis 98. Additionally, the radial openings 104 may pass through enlarged areas 106 where the wall thickness is increased compared to the wall thickness of other parts of the mounting collar 90. The radial openings 104 may be threaded or non-threaded and sized to accommodate the set screws 86. To simplify manufacturing, the radial openings 104 may be non-threaded openings, in which case an inner periphery of the mounting collar 90 may be formed with pockets 108, as can be seen in FIGS. 3 and 11. Each pocket 108 may be concentrically disposed about the axis D of the associated radial opening 104 and open to the radial opening 104 and the axial opening 102. Each pocket 108 may have an enlarged cross-section that is circular, non-circular or multi-sided, for example, each pocket 108 may have a six-sided cross-section configured to receive a standard threaded hex nut 110. The pockets 108 thus act as nut retaining pockets to accommodate the hardware for securing the set screws 86 without interfering with passage of the support post 70 through the axial opening 102 of the mounting collar 90. Additional nuts 110 may be threaded onto the set screws at the outside of the mounting collar 90. As will be understood, tightening the set screws 86 against the support post 70, being secured by threaded engagement with the nuts 110, may secure the coupling of the support post 70 and the mounting bracket 82, as will now be explained in greater detail.

The mounting arrangement may include various features that facilitate a secure, and also possibly an adjustable, connection between the support post 70 and the mounting bracket 82. For example, a detent arrangement and clamp surfaces may be provided at the interface between the support post 70 and the mounting bracket 82. The detent arrangement may include one or more mating projections and recesses formed in, or mounted to the, the support post 70 and the mounting bracket 82. In the illustrated example, the support post 70 has a plurality of openings or recesses 112 spaced apart along its length which can receive ends of the set screws 86. The engaging surfaces of the recesses 112 and set screws 86 interfere with relative rotation and axial translation of the support post 70 inside the axial opening 102 of the mounting collar 90. To enhance the engagement of the detent arrangement, the recesses 112 may be configured to complement the ends of the set screws 86. For example, the recesses 112 may have a conical shape corresponding to a conical ends of the set screws 86. The recesses 112 may have other configurations (e.g., cylindrical, oblong, multi-sided, and so on) to correspond to other configurations of the set screw ends.

To better ensure a strong clamp force between the support post 70 and the mounting collar 90, especially in the case of a cylindrical rod and collar, the axial opening 102 and/or the support post 70 may have clamp surfaces. The clamp surfaces may be located along the entire length of the interface between the support post 70 and the mounting collar 90, or at one or more specific areas less than the axial distance of the axial opening 102. For example, the clamp surfaces may be located at or near the upper and lower ends of the mounting collar 90, and thereby, provide two spaced apart clamping regions. The spacing of the clamping regions may serve to better resist force moments applied to the connection from various fore-aft or side loads transmitted through the support post 70 during operation of the coulter disk assembly 22.

Figure 6:
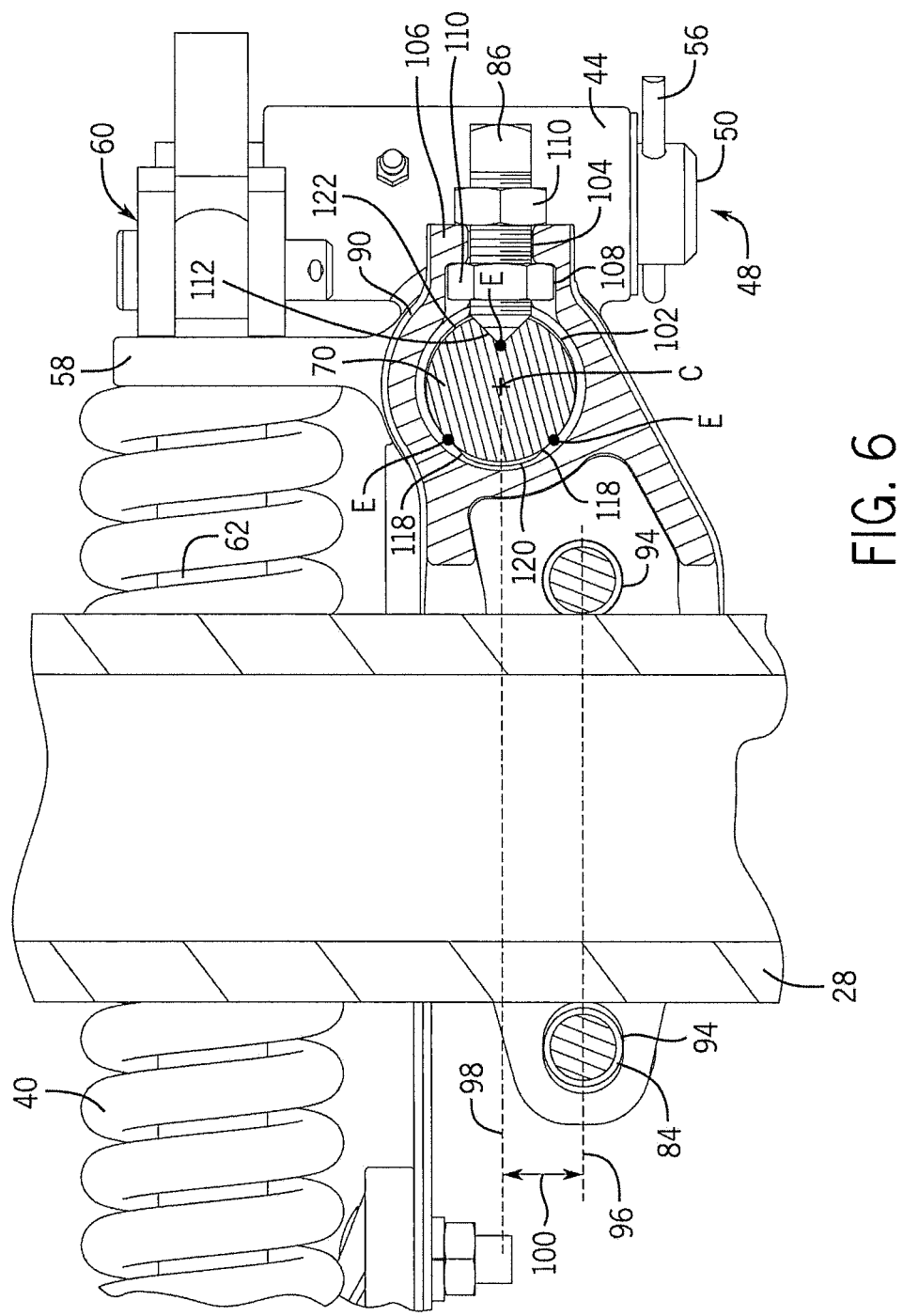
FIG. 6 is a partial sectional view thereof taken along line 6-6 of FIG. 5.

Referring to FIGS. 6 and 11 in particular, in the illustrated example in which the support post 70 is a cylindrical rod, the clamp surfaces are formed in the mounting bracket 82, and specifically, at the inner periphery of the axial opening 102 of the mounting collar 90. To widen the stance of the clamping regions in the manner mentioned above, a central section 114 of the axial opening 102 has a larger radial dimension than upper and lower end sections 116 at or near the upper and lower ends of the mounting collar 90. Consequently, the support post 70 does not, or at least does not primarily, engage the mounting collar 90 at the central section 114, but rather at the upper and lower end sections 116. In this case, the upper and lower end sections 116 define the clamping regions, which may include surfaces of different or non-uniform configuration relative to other areas of the inner periphery of the axial opening 102 so that they define the area of contact, or area of primary contact, with the support post 70 when the set screws 86 are tightened.

In the illustrated example, the clamp surfaces 118 are flat, angled surfaces located on each side or end of a radially extending clearance recess 120, which extends angularly less than 360 degrees, and may extend less than 180 degrees. The clamp surfaces 118 and the recess 120 are contiguous with a remaining arcuate (e.g., circular) portion 122 of the inner periphery. The shape of the clearance recess 120 be multi-sided or any circular or non-circular rounded configuration. In the case of a rounded clearance recess 120, its concavity or radial distance from the connection axis C would differ from that of the arcuate portion 122 of the inner periphery of the axial opening 102, at least at end sections 116. Each clearance recess 120 may be positioned across from the radial openings 104, such as having its center along the connection center line axis 98 about 180 degrees from the radial openings 104. This configuration allows the clearance recess 120 to provide a gap or spacing for the support post 70 to shift radially along the center line axis 98 when the set screws 86 are tightened to clamp the support post 70 against the flat clamp surfaces 118, rather than contacting the arcuate portion 122 of the inner periphery. When connected then, the axis of the support post 70$s$ is shifted or offset along the connection center line axis 98 to be aligned with the connection axis C, which may be offset a radial distance from a reference axis of the mounting collar 90, which would be the central axis of the arcuate portion 122 if, as shown, it had a uniform radial dimension (e.g., its cross-section formed part of a circle).

Moreover, in the illustrated example, the "circumferential" (i.e., circular or non-circular radial distance) of the clearance recess 120, and thus the spacing between the clamp surfaces 118, may be selected to provide a symmetric angular spacing about the center line axis 98, and further equiangular spacing between the two clamp surfaces 118 and the detent recess 112 where the set screw 86 engages the support post 70. Points "E" shown in FIG. 6 depict three points angularly spaced apart 120 degrees. It should be noted that while points E represent the loci of point contact, surface area contact may be achieved at the clamp surfaces 118 and the detent 112, as depicted in the drawings. Thus, this configuration may provide three, equiangularly spaced contact or clamp points or areas, which provide a secure, balanced connection. Other configurations than that illustrated, however, are possible. For example, the contact between the set screw 86 and the support post 70 may be other than the conical configuration shown in the drawings (e.g., flat plane or round tangent contact). Other example variations include forming the assembly without the enlarged central section 114, or with a different number, spacing angle or configuration of the clamping contact surfaces.

Figure 12:
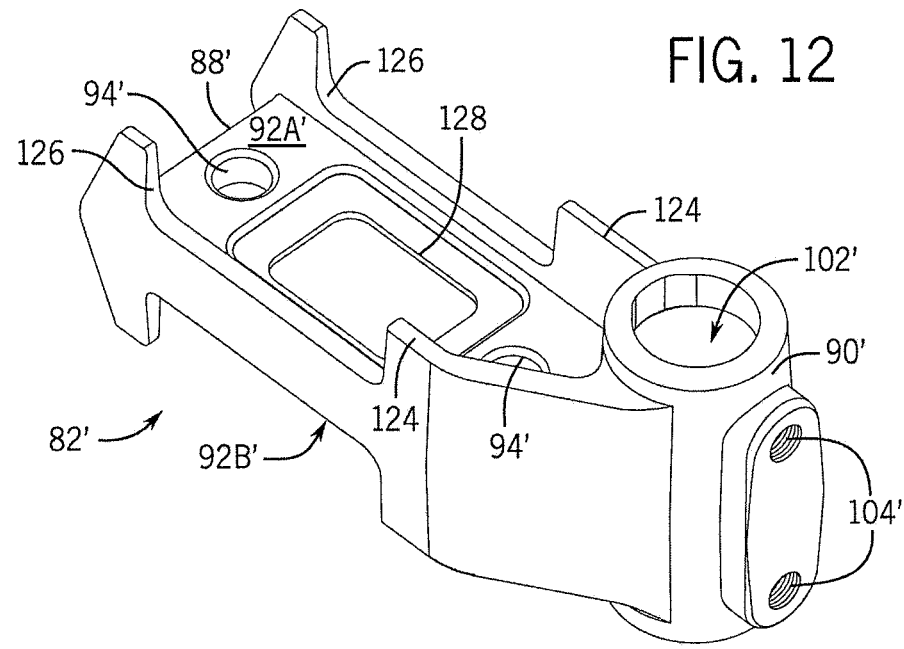
FIG. 12 is a perspective view of a mounting bracket having an alternate configuration.
Figure 13:
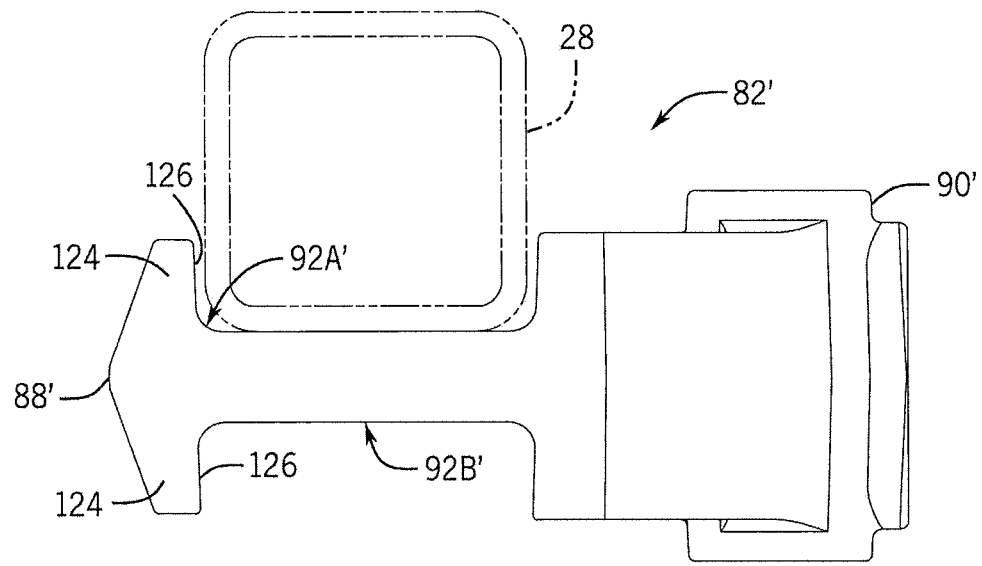
FIG. 13 is a side view thereof with the frame shown for reference.

FIGS. 12 and 13 illustrate another example configuration for the support flange 88' of an alternate mounting bracket 82' that may be used advantageously with the square tube support frame member 28 illustrated. Specifically, the support flange 88' has a recessed support face 92A' and mounting openings 94'. The support face 92A' is recessed below the tops of side walls 124 at the lateral sides of the support face 92'. The side walls 124 have square notches 126 in aligned with each other and sized to accommodate the support frame member 28. In this way, the support frame member 28 nests within the notches 126 when it engages the upper support face 92' between the upright edges of the notches 126. This nesting arrangement may further aid in securing the mounting position of the coulter disk assembly 22 by physical engagement of the side walls 124 with the support frame member 28. The support flange 88' has a similar configuration at the opposite side of the mounting bracket 82', including notched side walls 124 and a recessed support face 92B'. It should also be noted that in the example alternate configuration illustrated in FIGS. 12 and 13, the support flange 88' has an open core or central area 128, such as for material reduction and cost savings purposes. Further, the support faces 92A' and 92B' may have other features formed therein used for other purposes, such as additional alignment or mounting features for complementary engagement with features of the support frame member. Additionally, the support flange may have other configurations to complement the size and shape of a differently configured support member.

In the embodiment of the mounting bracket 82' shown in FIGS. 12 and 13, the mounting collar 90' may be configured with an axial opening 102' having the same or similar configuration for clamping the support port 70, as described above with regard to mounting bracket 82. The features of the mounting bracket 82' will thus not be described herein in detail. However, the illustrated alternative example is shown as having radial openings 104' that are threaded, and as such the mounting collar 90' may formed without the pockets 108 shown and described above.

In either illustrated example (or other) configuration of the mounting bracket 82, the mounting arrangement disclosed permits the coulter disk assembly 22 to be mounted to the support frame member 28 in various and numerous positions and orientations. The channel clamp fastener arrangement permits the coulter disk assembly 22 to be mounted along any one of the support frame members 28 of the frame 26, at the center or outer wings of the implement 20, at any location needed to align the assemblies with other like or different tools (e.g., the standards) and/or to avoid other features (e.g., other frame members, wheel mounts, hydraulics, etc.). Moreover, due to the offset configuration of the support flange with respect to the mounting collar, as well as the top side, bottom side symmetry and the symmetry of the support flange about its center line, the mounting bracket can be mounted in the assembly in different orientations to alter the mounting position of the coulter disk 34 relative to the frame 26.

For example, FIG. 7 illustrates various mounting positions for the coulter disk assembly 22 made possible simply by reorienting the same mounting bracket. Identical coulter disk assemblies 22A-22C are depicted as mounted to the frame 26 in different positions with respect to the support frame member 28. Coulter disk assembly 22A is shown with the mounting bracket 82 in the orientation shown in FIG. 2, such that the support post 70 is mounted forward of the support frame member 28 and inside (i.e., closer to the longitudinal center line of the implement 20) of the channel clamp fastener 84. Coulter disk assembly 22B is shown with the mounting bracket 82 in an inverted orientation from that shown in FIG. 2, such that the opposite face 92B contacts the underside of the support frame member 28. In this orientation, the support post 70 is again mounted forward of the support frame member 28, however to the outside of the channel clamp fastener 84. Such re-orienting of the mounting bracket 82 permits the support post 70 to remain forward of the support frame member 28, while be shifted laterally without requiring repositioning of the channel clamp fastener 84. This may be advantageous to allow the coulter disk 34 to be aligned at a position where mounting the clamp fastener 84 would be interfered with by a frame joint (or other feature). Coulter disk assembly 22C is shown with the mounting bracket 82 in a reversed orientation from that shown in FIG. 2, that is pivoted 180 degrees with respect to connection axis C, so that the support post 70 may be mounted rearward of the support frame member 28 (and outside of the channel clamp fastener 84). As shown, this adjustability is especially useful when other features are in near forward proximity to the support frame 28, and to otherwise provide for changes in the coulter disk 34 position in the fore-aft direction. Although not shown, another mounting position may provided in which the support post 70 is rearward of the support frame member 28 but inside of the channel clamp fastener 84. This is achieved by inverting the mounting bracket 82 so that face 92B contacts the underside of the support frame member 28 when in the reversed position of coulter disk assembly 22C. This re-orienting of the mounting bracket 82 again permits lateral position adjustment without requiring repositioning of the channel clamp fastener 84.

Another aspect of the disclosed mounting arrangement is that it may facilitate efficient manufacturing. As already mentioned, a single mounting bracket may be used to provide various mounting positions for the coulter disk assembly 22. Additionally, the disclosed arrangement may also reduce the amount of secondary operations required to complete manufacturing of the components. For example, the components of the coulter disk assembly 22, especially the support post 70 and the mounting bracket 82, may be formed by a casting process without the needed for secondary machining or other tooling of the cast parts. As one example, by providing hardware retaining pockets 108 for the set screws 86 the radially openings 104 need not be threaded, thereby eliminating the related tooling step. Further, by providing the support post clamp arrangement disclosed, relatively coarse part tolerances may be used without sacrificing securing connection of the mounting arrangement. As a result, the support post and/or the mounting bracket can be cast parts without requiring machining of the axial opening or other features at the interface of the mounting bracket connection with the support post.

It should also be noted that this disclosure encompasses various modifications to the examples described and depicted herein. For example, as noted above, it should be understood that this disclosure encompasses reversal of mating male-female components. For example, in certain embodiments the mounting collar may be a feature of the support post, rather than the mounting bracket, which may have a corresponding rod portion. Also, the detent and clamping arrangement could be arranged on opposite mating parts as that described. For example, the detent arrangement be achieved by projections on the support post and recess in the mounting bracket. Similarly, the clamping surfaces could be located on the support post with a simple cylindrical bore in the mounting bracket. Various other aspects of the disclosure could be altered from the described examples.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tool assembly for an agricultural implement having a support frame, the assembly comprising:
   a ground-engaging tool;
   a support post coupled to the tool;
   a mounting bracket connecting the support post at an connecting axis; and
   a frame mount coupled to the mounting bracket to mount the tool to the support frame;
   wherein at least one of the support post and the mounting bracket includes a rod having a curved outer periphery and a collar having an axial opening about the connection axis and configured to receive the rod;
   wherein the collar defines a recessed pocket open to the axial opening and a radial passage extending between the recessed pocket and an outer surface of the collar;
   wherein the pocket is configured to receive a first threaded fastener and the passage is configured to receive a second threaded fastener configured to extend into the axial opening to engage the rod, the first threaded fastener threadedly engaging the second threaded fastener; and
   wherein the axial opening has an inner peripheral surface configured to provide more than one contact area between the support post and the collar;
   wherein the inner peripheral surface at least in part includes at least one clearance recess extending about the inner peripheral surface less than 360 degrees and at least one clamp surface disposed angularly between the at least one clearance recess and another portion of the inner peripheral surface having at least one of a different concavity and a different radial dimension from the connection axis than the at least one clearance recess;
   wherein the inner peripheral surface defines a central section and at least one end section disposed outward of the central section, the central section having a larger opening dimension than the at least one end section; and
   wherein the at least one clearance recess and the at least one clamp surface are located at the at least one end section.

2. The assembly of claim 1, wherein the pocket is multi-sided.

3. The assembly of claim 1, wherein the support post defines the rod and the mounting bracket defines the collar; and wherein the support post includes at least one detent recess configured to receive a set screw.

4. The assembly of claim 1, wherein the mounting bracket has an offset support flange extending along a mounting center line axis spaced from a connection center line axis intersecting the support frame and the connection axis;
   wherein the frame mount is a channel fastener having two legs defining an opening corresponding to a cross-section of the support frame and received in openings in the support flange spaced apart along the mounting center line axis; and
   wherein the mounting bracket is couplable to the support post in alternate orientations including:
   a first orientation in which the mounting bracket is positioned to mount the support post to a first fore-aft side of the support frame and mount the frame mount to a first side of the connection center line axis;
   a second orientation in which the mounting bracket is positioned to mount the support post to the first fore-aft side of the support frame and mount the frame mount to a second side of the connection center line axis opposite the first side of the connection center line axis; and
   a third orientation in which the mounting bracket is positioned to mount the support post at a second fore-aft side of the support frame and the frame mount is at one of the first and second sides of the connection center line axis.

5. A tool assembly for an agricultural implement having a support frame, the assembly comprising;
   a ground-engaging tool;
   a support post coupled to the tool;
   a mounting bracket connecting the support post at a connection axis; and
   a frame mount coupled to the mounting bracket to mount the tool to the support frame;
   wherein at least one of the support post and the mounting bracket includes a rod and a collar having an axial opening about the connection axis configured to receive the rod;
   wherein the axial opening has an inner peripheral surface configured to provide more than one contact area between the rod and the collar;
   wherein the rod has a curved outer peripheral surface and wherein the inner peripheral surface at least in part includes at least one clearance recess extending about the inner peripheral surface less than 360 degrees and at least one clamp surface disposed angularly between the at least one clearance recess and another portion of the inner peripheral surface having at least one of a different concavity and a different radial dimension from the connection axis than the at least one clearance recess;
   wherein the inner peripheral surface defines a central section and at least one end section disposed outward of the central section, the central section have a larger opening dimension than the at least one end section; and
   wherein the at least one clearance recess and the at least one clamp surface are located at the at least one end section.

6. The assembly of claim 5, wherein the at least one clamp surface is at least in part a flat surface.

7. The assembly of claim 5, wherein there are two end sections, at each end section, the inner peripheral surface defines one clearance recess and two clamp surfaces, one clamp surface adjacent to each end of the clearance recess.

8. The assembly of claim 7, wherein the support post includes at least one detent recess configured to receive a set screw; and
   wherein, when the support post is mounted to the mounting bracket, the detent recess is located to be equiangularly spaced from the clamp surfaces.

9. A tool assembly for an agricultural implement having a support frame, the assembly comprising:
   a ground-engaging tool;
   a support post coupled to the tool;
   a mounting bracket connecting the support post at a connection axis; and
   a frame mount coupled to the mounting bracket to mount the tool to the support frame;
   wherein the mounting bracket is couplable to the support post in alternate orientations including:
   a first orientation in which the mounting bracket is positioned to mount the support post to a first fore-aft side of the support frame and mount the frame mount to a first side of a connection center line axis intersecting the support frame and the connection axis;

a second orientation in which the mounting bracket is positioned to mount the support post to the first fore-aft side of the support frame and mount the frame mount to a second side of the connection center line axis opposite the first side of the connection center line axis;

wherein the support post is a rod having a curved outer periphery and the mounting bracket defines a collar having an axial opening extending about the connection axis and receiving the support post;

wherein the axial opening has an inner peripheral surface configured to provide more than one contact area between the support post and the collar;

wherein the inner peripheral surface at least in part includes at least one clearance recess extending about the inner peripheral surface less than 360 degrees and at least one clamp surface disposed angularly between the at least one clearance recess and another portion of the inner peripheral surface having at least one of a different concavity and a different radial dimension from the connection axis than the at least one clearance recess;

wherein the inner peripheral surface defines a central section and at least one end section disposed outward of the central section, the central section having a larger opening dimension than the at least one end section; and wherein the at least one clearance recess and the at least one clamp surfaec are located at the at least one end section.

10. The assembly of claim 9, wherein the mounting bracket is couplable to the support post in a third orientation in which the mounting bracket is positioned to mount the support post at a second fore-aft side of the support frame and the frame mount is at one of the first and second sides of the connection center line axis.

11. The assembly of claim 9, wherein the mounting bracket has an offset support flange extending along a mounting center line axis spaced from the connection center line axis.

12. The assembly of claim 11, wherein the frame mount is a channel fastener having two legs defining an opening corresponding to a cross-section of the support frame and received in openings in the support flange spaced apart along the mounting center line axis.

13. The assembly of claim 11, wherein the support flange has a recess configured to receive the support frame.

14. The assembly of claim 9, wherein at least one of the support post and the mounting bracket includes at least one detent arrangement including at least one mating protection and recess.

15. The assembly of claim 9, wherein the mounting bracket defines a recessed pocket open to the axial opening and a radial passage extending between the pocket and an outer surface of the collar;

wherein the pocket is configured to receive a first threaded fastener and the passage is configured to receive a second threaded fastener configured to extend into the axial opening to engage the support post; and wherein the first threaded fastener threadedly engages the second threaded fastener.

* * * * *